July 27, 1937.   L. M. YOUNG   2,088,457
COOKING UTENSIL
Filed Aug. 19, 1936
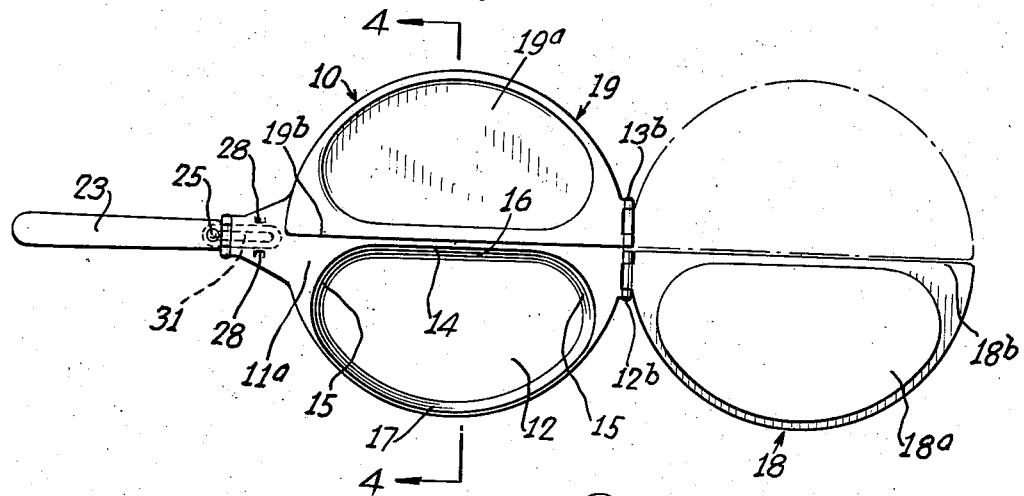
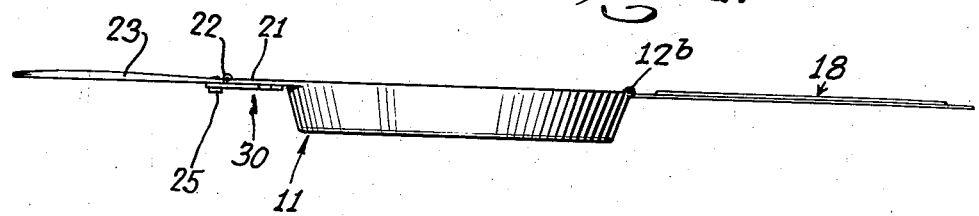
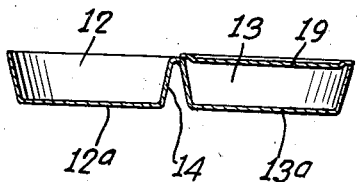
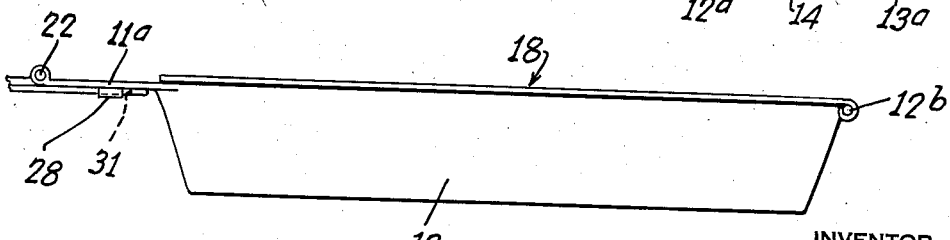
INVENTOR
LAMBERT M. YOUNG
BY
Carl Miller
ATTORNEY Patented July 27, 1937

2,088,457

UNITED STATES PATENT OFFICE 2,088,457

COOKING UTENSIL

Lambert M. Young, Lacrosse, Wash.

Application August 19, 1936, Serial No. 96,810

1 Claim. (Cl. 53—6)

This invention relates to cooking utensils.

An object of this invention is to provide a cooking utensil formed with separate compartments and having hinged covers for individually covering the separate compartments.

Another object of this invention is to provide a cooking utensil of the character described, provided with a collapsible handle and having means for fixing the handle rigidly to the utensil, whereby the utensil may be held by its handle.

A further object of this invention is to provide a neat, compact and durable cooking utensil of the character described, which shall be relatively inexpensive to manufacture, easy to assemble and manipulate, and withal, practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawing, in which is shown one of the various possible illustrative embodiments of this invention, Fig. 1 is a top plan view of a cooking utensil embodying the invention with one of the covers opened and the other closed;

Fig. 2 is a side elevational view of the cooking utensil shown in Fig. 1;

Fig. 3 is an enlarged detailed view of the utensil with both covers closed; and

Fig. 4 is a cross-sectional view taken on line 4—4 of Fig. 1.

Referring now in detail to the drawing, 10 designates a cooking utensil embodying the invention. The same may be made of sheet or cast metal and comprises a panlike circular body 11 having two depressed compartments 12 and 13 separated at the middle by a diametric wall 14 of inverted U-shape. Each compartment 12 is substantially semi-circular in shape and has curved ends 15, a straight inner side 16 and a curved outer side 17, having the curvature of the annular member 11. The compartments are formed by depressing the member 11 downwardly, whereby said compartments have flat bottom walls 12a and 13a respectively. The compartments are preferably of similar depth.

Hinged to an edge of the member 11, as by aligned hinges 12b and 13b, disposed at right angles to and on opposite sides of partition 14, are a pair of covers 18 and 19 adapted to selectively cover the compartments 12 and 13 respectively. Said covers 18 and 19 have portions contacting the top surface 11a of the member 11 and are formed with shallow flat depressions 18a and 19a conforming to the shape of the compartments 12 and 13. The covers 18a and 19a are of semi-circular shape and have adjacent diametrical straight edges 18b and 19b overlying the partition 14. Said covers may be selectively moved to covering or uncovering positions. The hinges 12b and 13b are preferably so constructed that the covers may be opened 180°, so as to remain in horizontal position when open.

The body 11 has at the side thereof diametrically opposite to the hinges 12b, 13b, a flat extension 21 provided with a hinge 22 disposed parallel to said hinges. Hinged on said hinge 22 is a handle 23 aligned with said partition 14. Fixed to said handle adjacent said hinge 22 is a pin 25 having at the bottom end thereof a head 26. The extension 21 is formed on the under side thereof with a pair of parallel projections 28 serving as guides for a slotted member 30 slidably mounted therebetween and formed with an elongated slot 31 receiving the shank of the pin 25 therethrough and resting on the head 26 of said pin. When the handle is open and the slotted member is in the position shown in Figs. 1, 2 and 3 of the drawing, the handle may be held in the hand for supporting the pan body 11, the slotted member serving to hold the handle in horizontal alignment with the top surface of said bottom. The handle, however, may be rotated 180° in a clockwise direction looking at Fig. 2 of the drawing to collapse or fold the same over the top of the pan. In such event, the slotted member 30 is moved into overlying position with respect to the handle so as not to project substantially therefrom.

It will now be understood that the utensil may be used for frying or cooking and may be conveniently collapsed into a compact condition for storing, shipping or transportation.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

A cooking utensil comprising a structurally integral substantially circular shallow body portion having a bottom, side walls and a centrally disposed integral inverted U-shaped partition dividing said body into two similar compartments, each compartment having internally thereof a pair of oppositely disposed ends, a substantially straight inner side and a curved outer side, the latter corresponding to the curvature of the body portion, a handle connected to one end of said body portion and a pair of aligned hinges integral with the upper edge of said walls disposed at right angles to the plane of and on opposite sides of said partition and at the end of the body portion opposite said handle, a pair of similar covers carried by said hinges, said covers each having internal depressed portions of a shape and size conforming to the shape and size of one of said compartments.

LAMBERT M. YOUNG.